(12) United States Patent
Ho

(10) Patent No.: US 7,445,252 B2
(45) Date of Patent: Nov. 4, 2008

(54) CONNECTING DEVICE

(75) Inventor: Ying-Kuan Ho, Tainan (TW)

(73) Assignee: Ying Yeeh Enterprise Co., Ltd., Tainan (TW)

( * ) Notice: Subject to any disclaimer, the term of this patent is extended or adjusted under 35 U.S.C. 154(b) by 2 days.

(21) Appl. No.: 11/699,895

(22) Filed: Jan. 29, 2007

(65) Prior Publication Data
US 2008/0179885 A1 Jul. 31, 2008

(51) Int. Cl.
F16L 23/00 (2006.01)

(52) U.S. Cl. ........................................ 285/409; 285/407

(58) Field of Classification Search ................ 285/407, 285/409, 365, 420; 24/273, 270, 271, 71 T, 24/71 SK
See application file for complete search history.

(56) References Cited

U.S. PATENT DOCUMENTS 3,336,643 A * 8/1967 Robison ..................... 24/270
3,520,563 A * 7/1970 Decker, Jr. .................. 285/420
4,395,801 A * 8/1983 Gabrielli .................... 24/70 SK
5,188,400 A * 2/1993 Riley et al. ................. 285/419
6,880,859 B2 * 4/2005 Breay et al. ................. 285/363

* cited by examiner

Primary Examiner—Aaron M Dunwoody
(74) Attorney, Agent, or Firm—Pro-Techtor Int'l Services

(57) ABSTRACT

A connecting device between two tubes for defining a play place for pets, comprises: a female retainer, a male retainer and a quick connect and release locking clamp. The female retainer includes a concave portion and two protruding shafts. The male retainer is pivotally connected with the female retainer and includes a clamping portion. The quick connect and release locking clamp is pivotally connected with the male retainer and includes two grooves. The clamping portion engages in the concave portion, and the two grooves are engaged with the two protruding shafts, so that the two tubes are connected to define a play place for pets.

4 Claims, 6 Drawing Sheets

CONNECTING DEVICE

BACKGROUND OF THE INVENTION

1. Field of the Invention

The present invention relates to a connecting device between two tubes for defining a play place for pets, and more particularly to the technique of quick connect and release of the two tubes.

2. Description of the Prior Art

The conventional connecting device for connecting two tubes (as shown in FIG. 1) comprises an annular stopping portion 101 formed in the middle of the inner surface of a frame 100, and a plurality of restricting ribs 102 disposed on the inner surface of the frame 100 and located at both sides of the annular stopping portion 101. Two tubes 200 and 200a each is formed at the end thereof close to the frame 100 with an annular flange 201, 201a. The annular flanges 201, 201a of the two tubes 200 and 200a are pressed over the restricting ribs 102 until they abut against the annular stopping portion 101 (namely they are confined between restricting ribs 102 and the annular stopping portion 101), such that the two tubes 200 and 200a are connected by the frame 100. However, when assembling the two tubes 200, 200a into the frame 100, the user has to press the tubes 200, 200a arduously to make the annular flanges 201 and 201a move over the restricting ribs 102 until abutting against the annular stopping portion 101, and similarly, when disconnecting the two tubes, the user has to pull out the tubes 200, 200a arduously to disengage the two annular flanges 201, 201a from the restricting ribs 102. As we can see, connecting and disconnecting the two tubes 200, 200a is time consuming and labor intensive.

The present invention has arisen to mitigate and/or obviate the afore-described disadvantages.

SUMMARY OF THE INVENTION

The primary objective of the present invention is to provide a connecting device between two tubes, comprises: a female retainer, which includes a concave portion and two protruding shafts; a male retainer pivotally connected with the female retainer, which includes a clamping portion; a quick connect and release locking clamp pivotally connected with the male retainer, which includes two grooves; the clamping portion engages in the concave portion, the two grooves to be engaged with the two protruding shafts, so the two tubes are connected thereby for defining a play place for pets.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
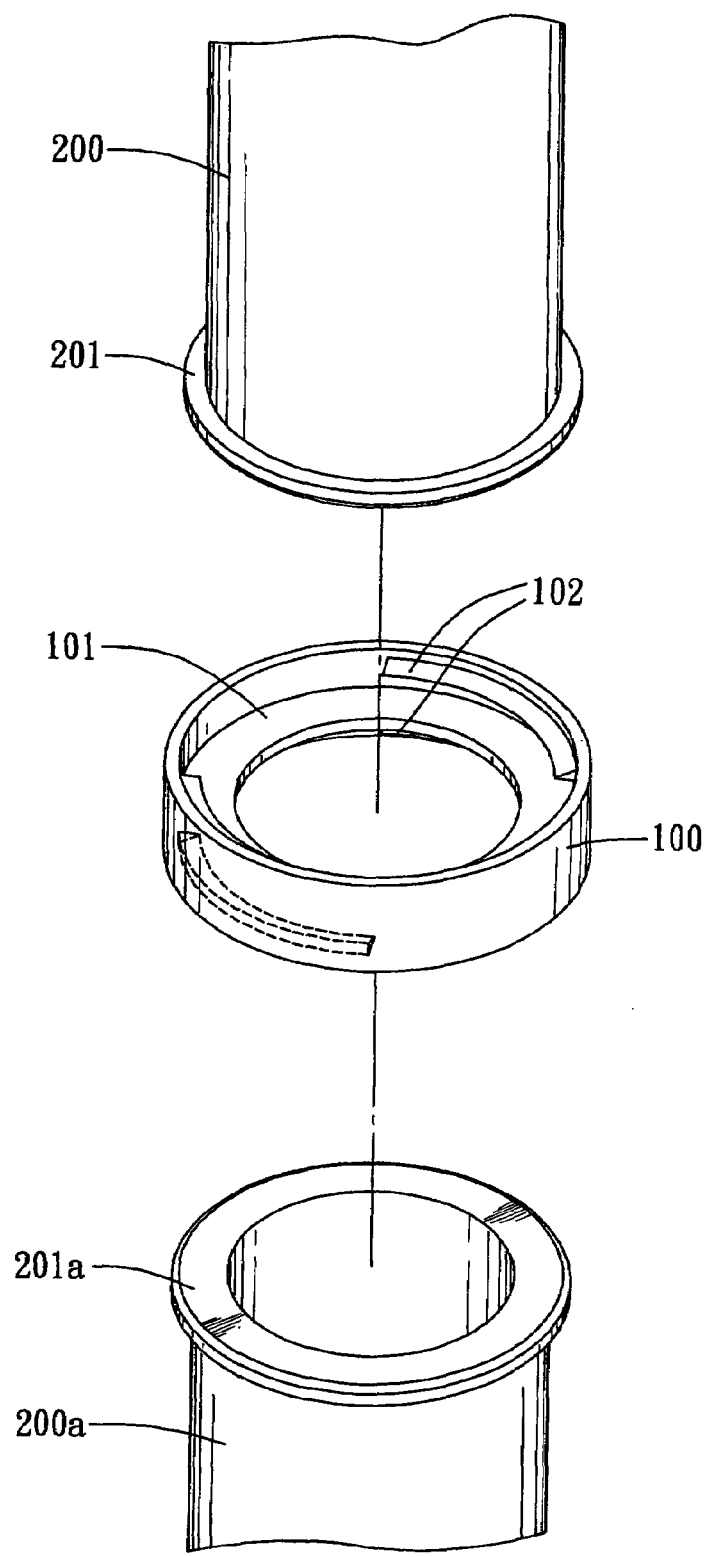
FIG. 1 is an exploded view of a conventional connecting device.
Figure 2:
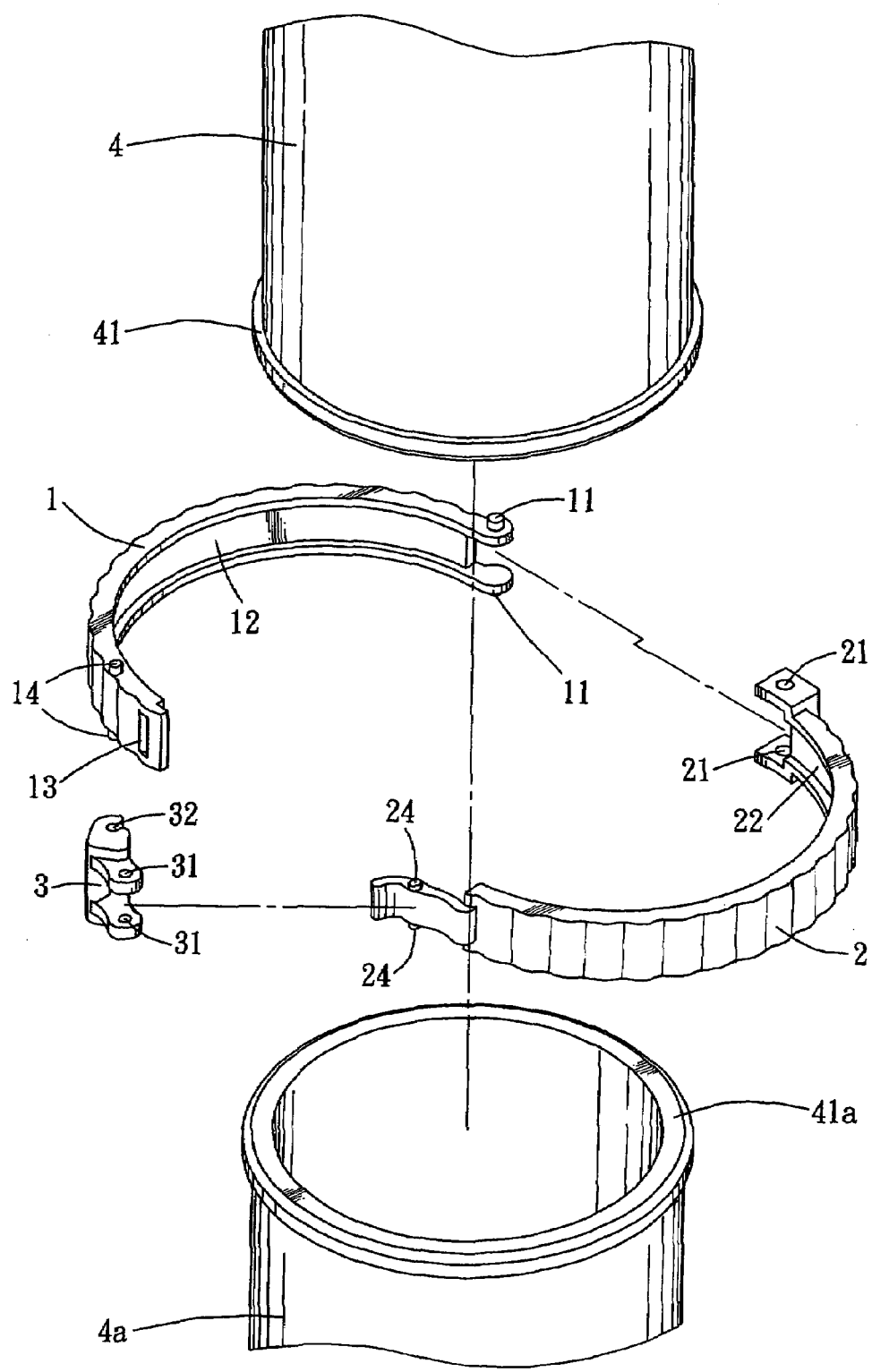
FIG. 2 is an exploded view of the present invention.

Referring to FIG. 2, a connecting device between two tubes for defining a play place for pets in accordance with the present invention comprises: a female retainer 1, a male retainer 2 and a quick connect and release locking clamp 3.

Figure 3:
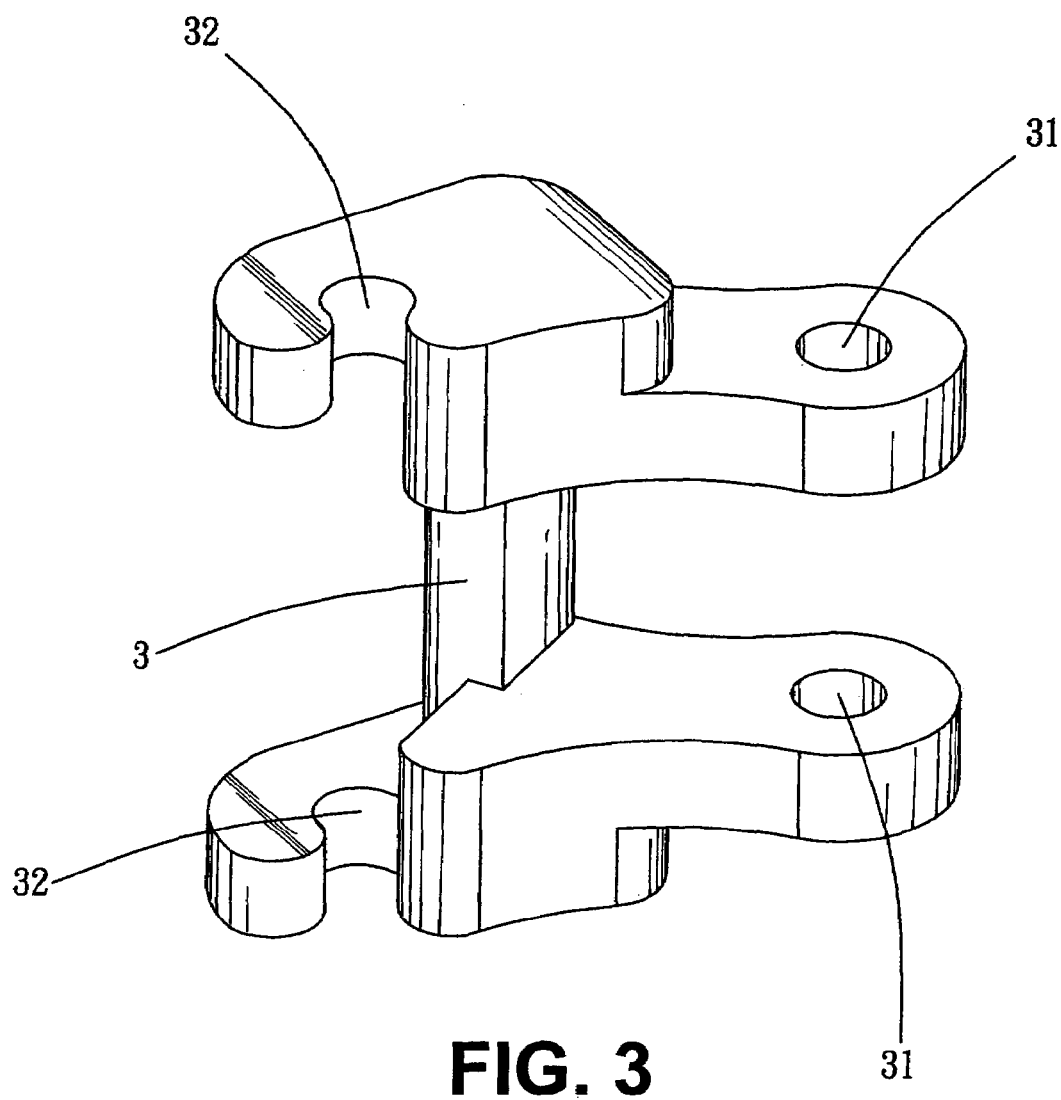
FIG. 3 is an enlarged view from another angle of showing the quick connect and release locking clamp in accordance with the present invention.
Figure 5A:
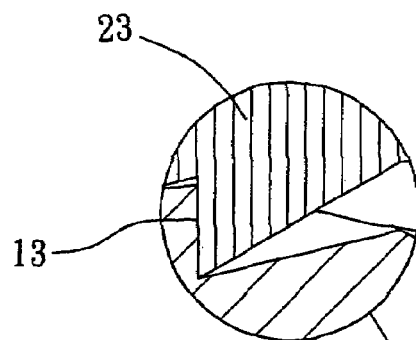
FIG. 5A is an enlarged cross section view of a part of FIG. 5, which shows the clamping portion of the male retainer engaging in the concave portion of the female retainer.
Figure 5:
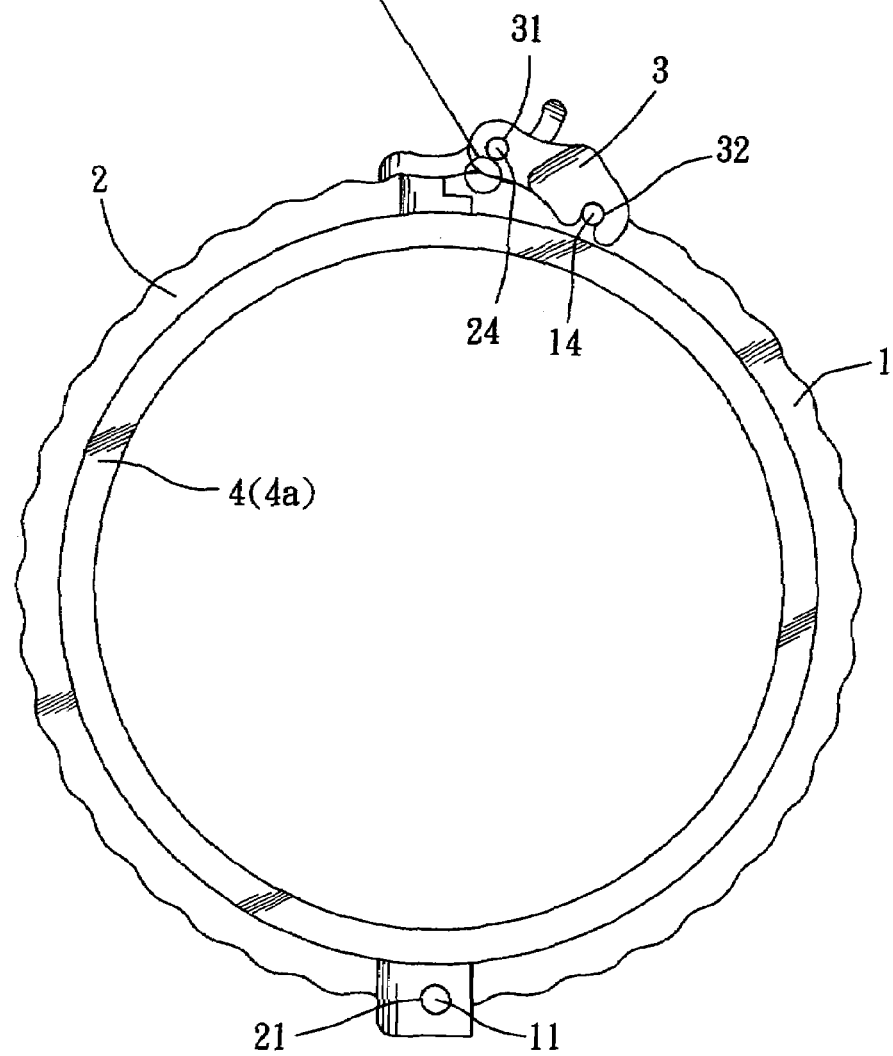
FIG. 5 is another plane view of the present invention, wherein the two tubes are connected together.

The female retainer 1 includes two pivots 11, a receiving portion 12, a concave portion 13 (as shown in FIG. 5A) and two protruding shafts 14. The male retainer 2 includes two through holes 21, a receiving portion 22, a clamping portion 23 and two protruding shafts 24. The two pivots 11 on the female retainer 1 engage with two through holes 21, so that the male retainer 2 can rotate around the two pivots 11. The quick connect and release locking clamp 3 includes two through holes 31, and two grooves 32, shown in FIG. 3, the two through holes 31 pivotally connected with the protruding shafts 24 of the male retainer 2, so that the quick connect and release locking clamp 3 can rotate around the two protruding shafts 24.

Figure 4:
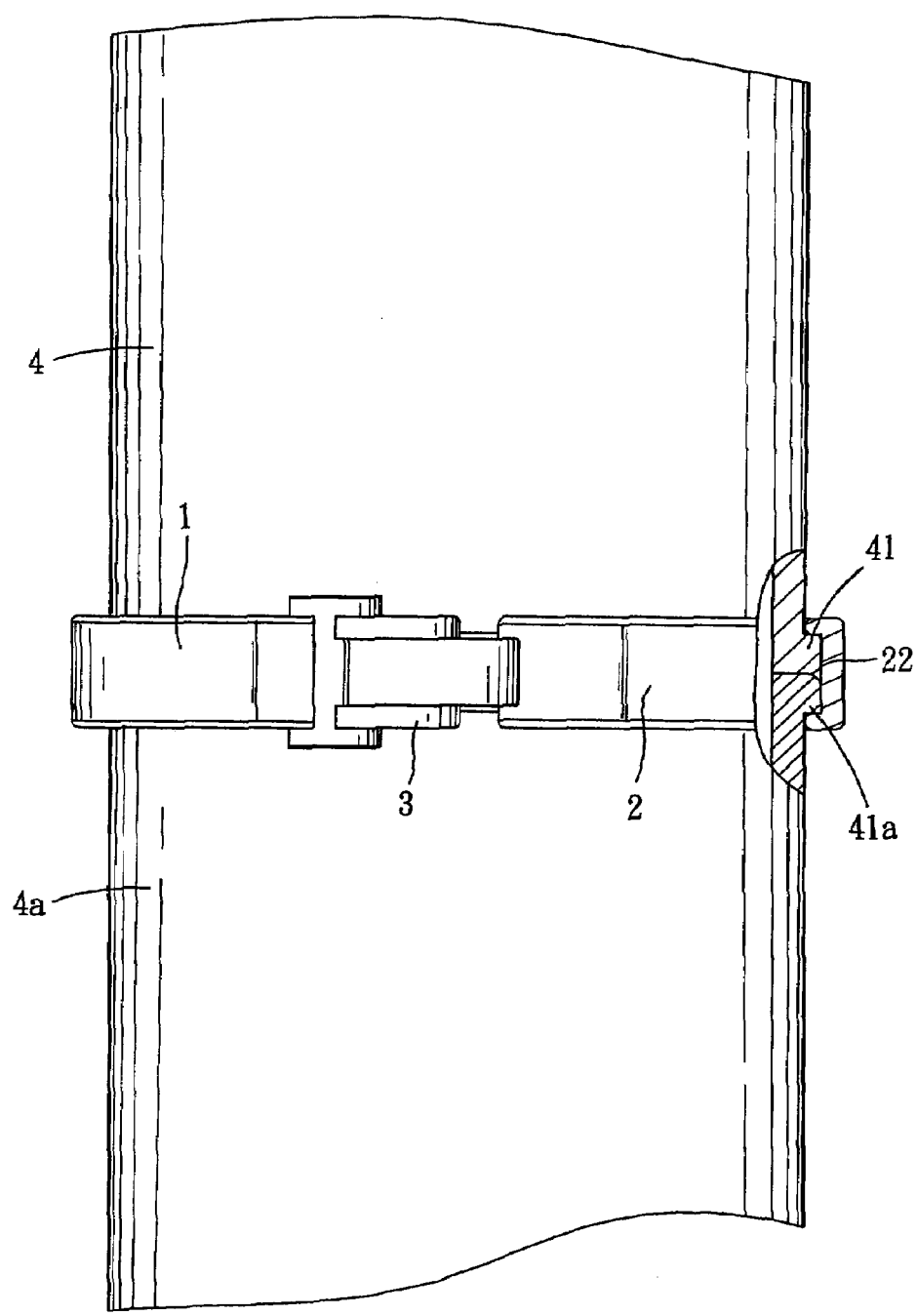
FIG. 4 is a plane view and partial cross section view of the present invention, wherein the two tubes are connected together.

In assembly an annular flange 41, 41a formed at one end of the each tube 4, 4a is received in the receiving portion 12 of the female retainer 1 and the receiving portion 22 of the male retainer 2, as shown in FIG. 4. Then the user can rotate one end of the male retainer 2 to make the clamping portion 23 engage with the concave portion 13 to hold the female retainer 1 to the male retainer 2, and then rotate one end of the quick connect and release locking clamp 3, to make the two grooves 32 engage with the two protruding shafts 14 of the female retainer 1 (as shown in FIG. 5A) thereby engaging the quick connect and release locking clamp 3, so that the two tubes 4, 4a are connected by the female retainer 1 and the male retainer 2.

When disconnecting the two connecting tubes 4, 4a, the user can turn the quick connect and release locking clamp 3 to make the two grooves 32 disengage from the protruding shafts 14 of the female retainer 1, and at the same time, the male retainer 2 is turned to make the clamping portion 23 separate from the concave portion 13 of the female retainer 1. After that, the female retainer 1 and the male retainer 2 are disengaged from each other, and the two tubes 4, 4a are easily disconnected accordingly.

Figure 6:
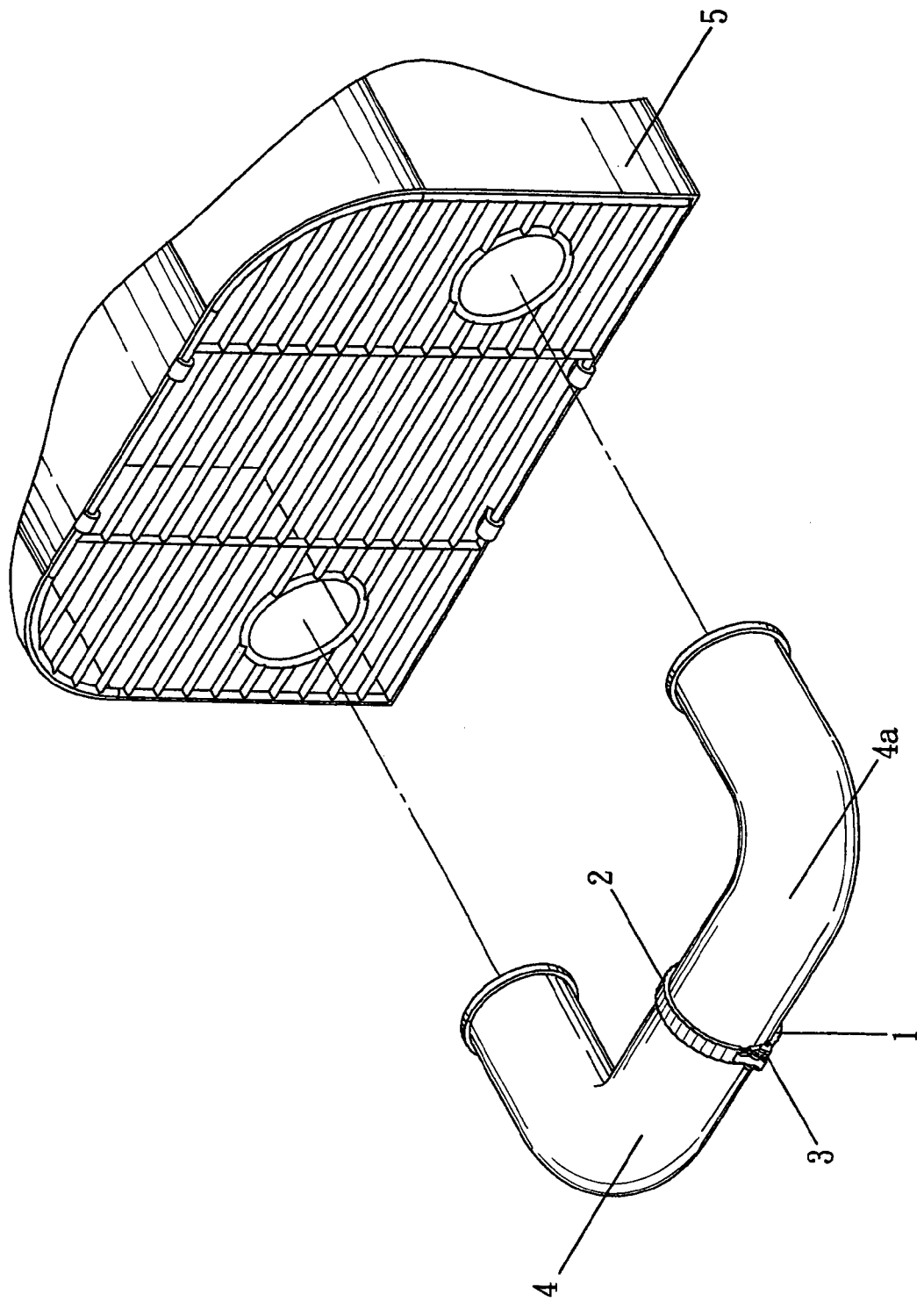
FIG. 6 is a perspective view in accordance with the embodiment of the present invention of showing that the two connected tubes can be integrally connected to a pet's cage.

After the two tubes 4, 4a are connected, they can be integrally connected with a pet's cage 5, as shown in FIG. 6, to define a play space for pets.

To sum up, the two tubes 4, 4a of the present invention can be stably connected and easily disconnected without wasting time and strength.

While we have shown and described various embodiments in accordance with the present invention, it is clear to those skilled in the art that further embodiments may be made without departing from the scope of the present invention.

The invention claimed is:

1. A connecting device between two tubes for defining a play place for pets comprising:
   a female retainer with a concave portion and two protruding shafts;
   a male retainer pivotally connected to the female retainer and having a clamping portion adapted to fittingly engage said concave portion;

a quick connect and release locking clamp pivotally connected to the clamping portion of the male retainer and having two grooves adapted to fittingly engage said protruding shafts; and two tubes received in the female retainer and the male retainer;

wherein the clamping portion is engaged with the concave portion, and the two grooves of the locking clamp are engaged with the two protruding shafts, so that the two tubes are connected by the female and male retainers.

2. The connecting device between two tubes for defining a play place for pets as claimed in claim 1, wherein each of the female retainer and the male retainer includes a receiving portion, and at one end of each tube is defined with an annular flange to be received in the receiving portion of the female retainer and the male retainer.

3. The connecting device between two tubes for defining a play place for pets as claimed in claim 1, wherein the female retainer includes two pivots, the male retainer is defined with two through holes for engaging with the two pivots.

4. The connecting device between two tubes for defining a play place for pets as claimed in claim 1, wherein the male retainer includes two protruding shafts, and the quick connect and release locking clamp is defined with two through holes for pivoting with the two protruding shafts.

* * * * *